United States Patent [19]
Tano et al.

[11] Patent Number: 5,353,385
[45] Date of Patent: Oct. 4, 1994

[54] INFERENCE METHOD AND APPARATUS FOR USE WITH KNOWLEDGE BASE SYSTEM AND KNOWLEDGE BASE SYSTEM SUPPORT METHOD AND APPARATUS USING THE INFERENCE METHOD AND APPARATUS

[75] Inventors: Shunichi Tano, Pittsburgh, Pa.; Shoichi Masui, Kawasaki; Toshihiko Nakano, Hitachi, both of Japan

[73] Assignee: Hitachi, Ltd., Tokyo, Japan

[21] Appl. No.: 677,577

[22] Filed: Mar. 29, 1991

[30] Foreign Application Priority Data

Apr. 3, 1990 [JP] Japan ................................. 2-88835

[51] Int. Cl.⁵ .............................................. G06F 15/00
[52] U.S. Cl. ........................................ 395/64; 395/62
[58] Field of Search .................... 395/50, 60, 62, 64

[56] References Cited

U.S. PATENT DOCUMENTS

| | | | |
|---|---|---|---|
| 4,704,695 | 11/1987 | Kimura et al. | 395/62 |
| 4,761,746 | 8/1988 | Tano et al. | 395/62 |
| 4,890,240 | 12/1989 | Loeb et al. | 395/51 |
| 4,949,388 | 8/1990 | Bhaskaran | 382/10 |
| 4,956,791 | 9/1990 | Lee et al. | 395/64 |
| 5,155,803 | 10/1992 | Barabash et al. | 395/64 |
| 5,265,193 | 11/1993 | Grady et al. | 395/64 |

OTHER PUBLICATIONS

Lee et al., "Dynamic Augmentation of Generalized RETE Networks for Demand-Driven Matching and Rule Updating", Sixth Conference of Artificial Intelligence Applications, 1990 pp. 123–129.

Frenzel, "Crash Course in Artificial Intelligence" and Expert Systems, 1987, pp. 76–83.

Eisenstadt et al., "Support for Knowledge Acquisition in the Knowledge Engineer's Assistant (KEATS)", Expert Systems, Feb. 1988, vol. 5 #1 pp. 6–28.

Charles L. Forgy, "Rete: A Fast Algorithm for the Many Pattern/Many Object Pattern Match Problem", (Artificial Intelligence), vol. 19, No. 1, 1982, pp. 17–37. (Provided in English).

Daniel P. Miranker, "TREAT: A Better Match Algorithm for AI Production Systems", AI Architectures (AAAI-87), 1987, pp. 42–47. (Provided in English).

*Primary Examiner*—Joseph Mancuso
*Assistant Examiner*—Steven P. Klocinski
*Attorney, Agent, or Firm*—Fay, Sharpe, Beall, Fagan, Minnich & McKee

[57] ABSTRACT

An inference method and an inference apparatus for use with a knowledge base system and knowledge base system supporting method and apparatus using the inference method and apparatus wherein there are employed rules each being comprised of a set of (1) a condition description part including a condition stipulating a plurality of states of a frame representing an object and constituting an object world of at least one pair of a slot and a value thereof and (2) an operation description part stipulating an operation to be executed when the condition is satisfied. For an inference processing, a rule for which a condition of its condition description part is satisfied is executed according to an operation described in the operation description part. A condition judging sequence is specified for satisfaction of a condition for each frame of the condition description part of the rule. It is also specified whether or not information related to a processing result obtained from a condition judge processing on each said frame is stored in a memory. Condition judgements are achieved for satisfaction of conditions respectively associated with the frames of the condition description part according to the specified sequence based on the processing results in the memory, thereby conducting a reasoning operation.

34 Claims, 16 Drawing Sheets

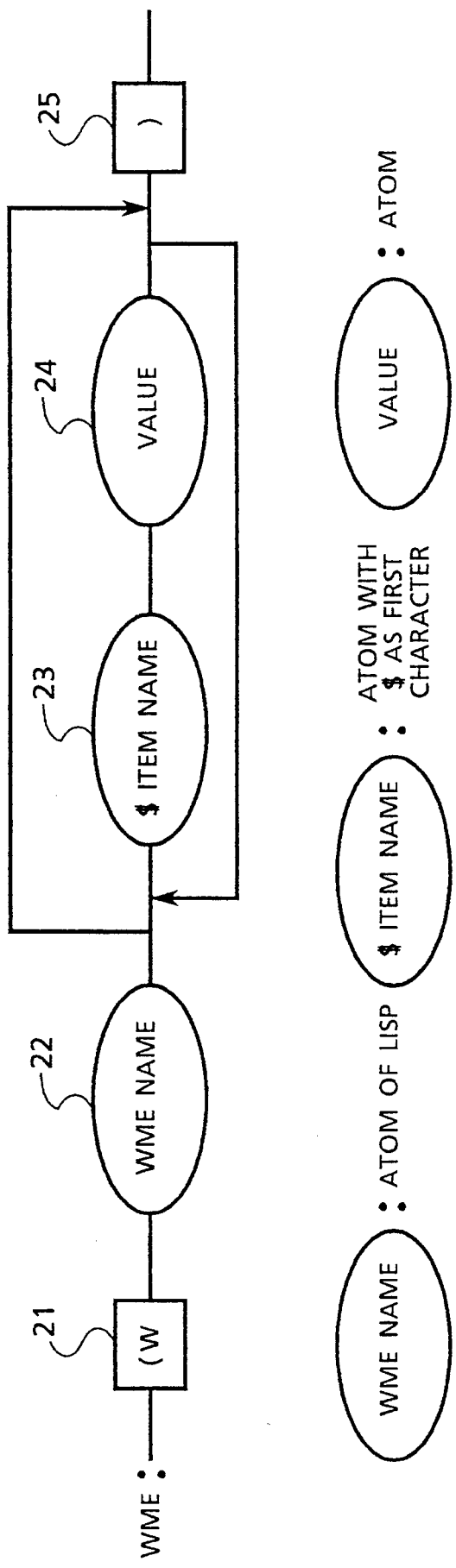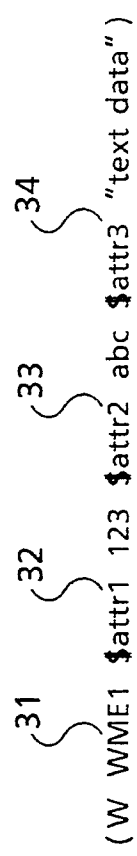

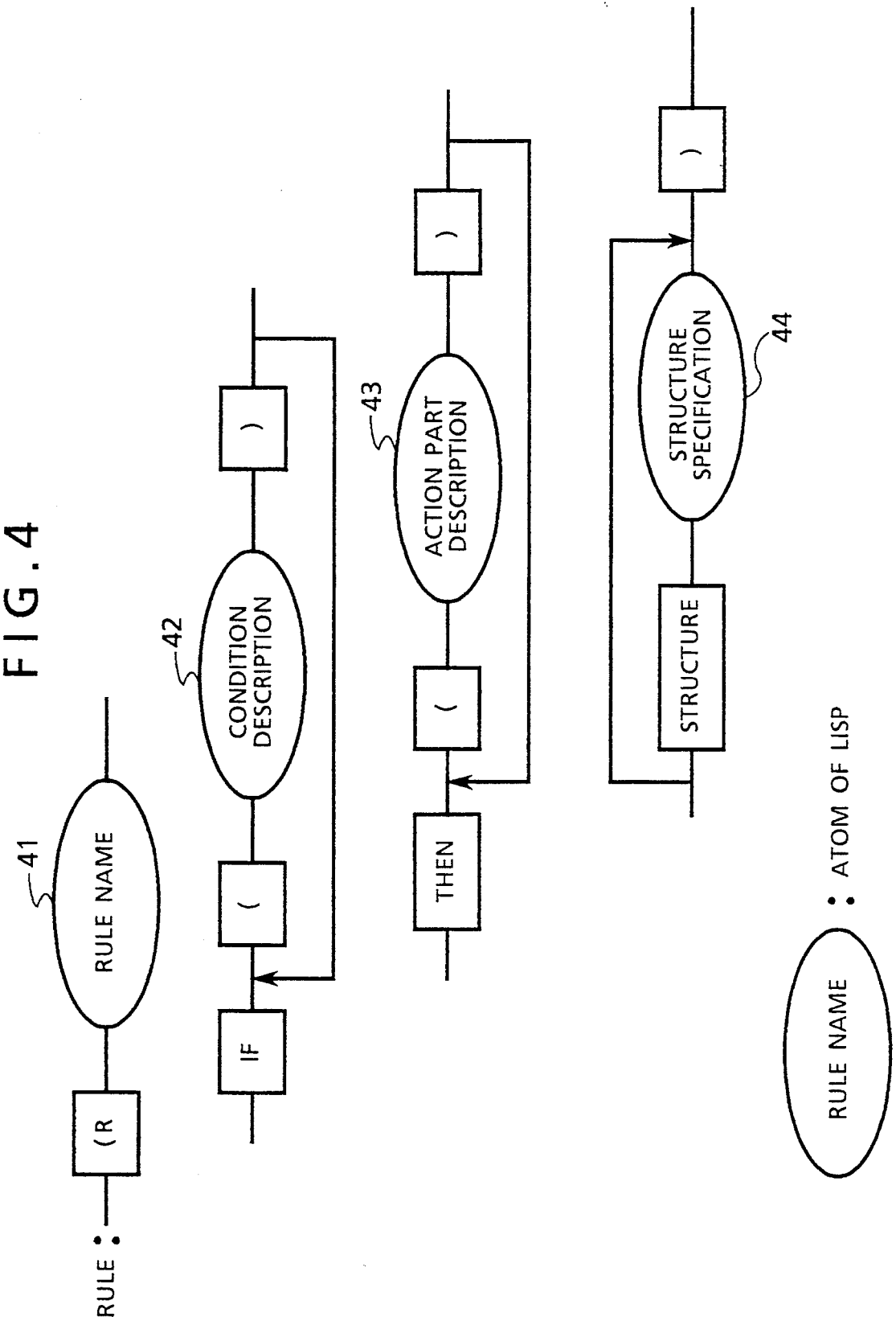

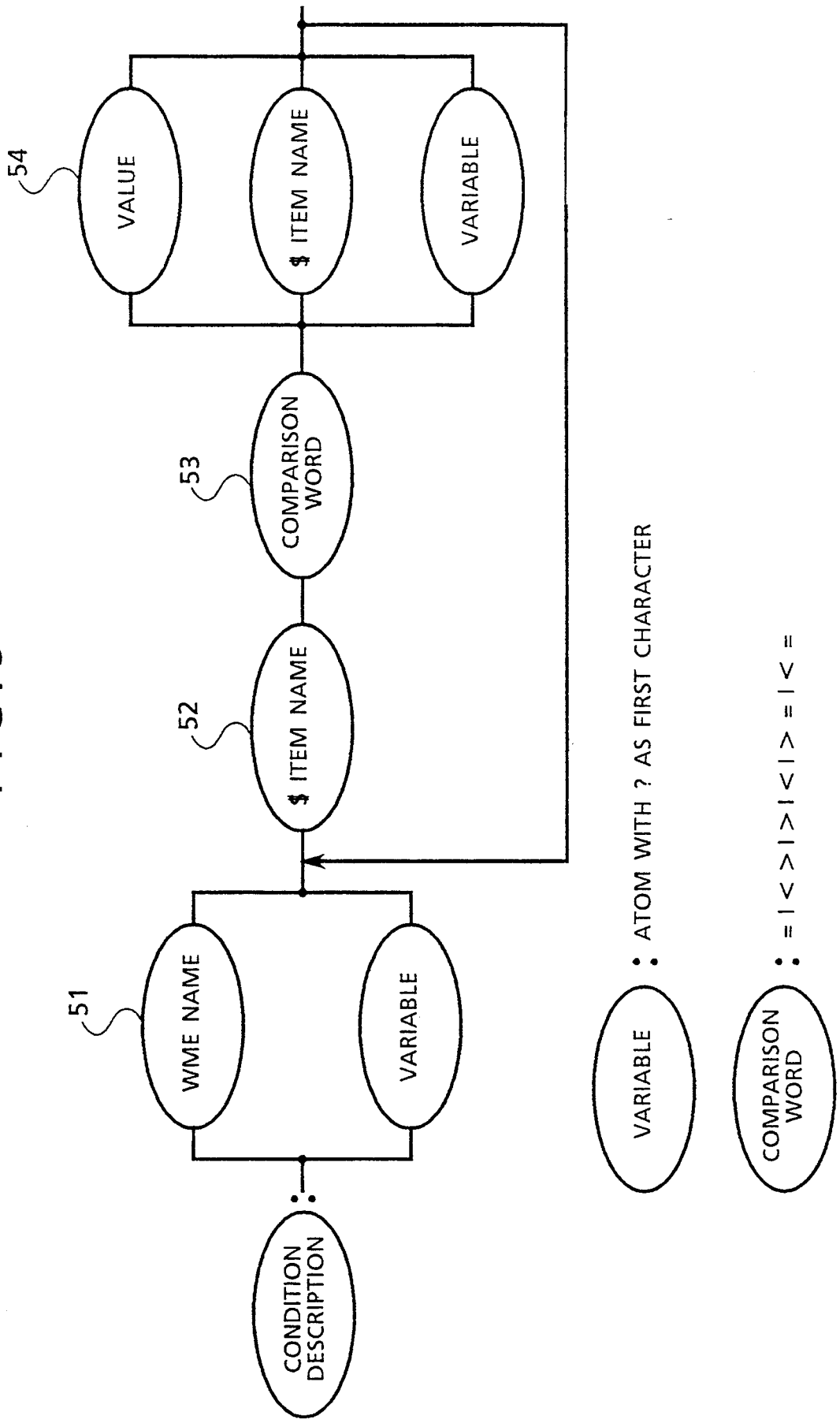

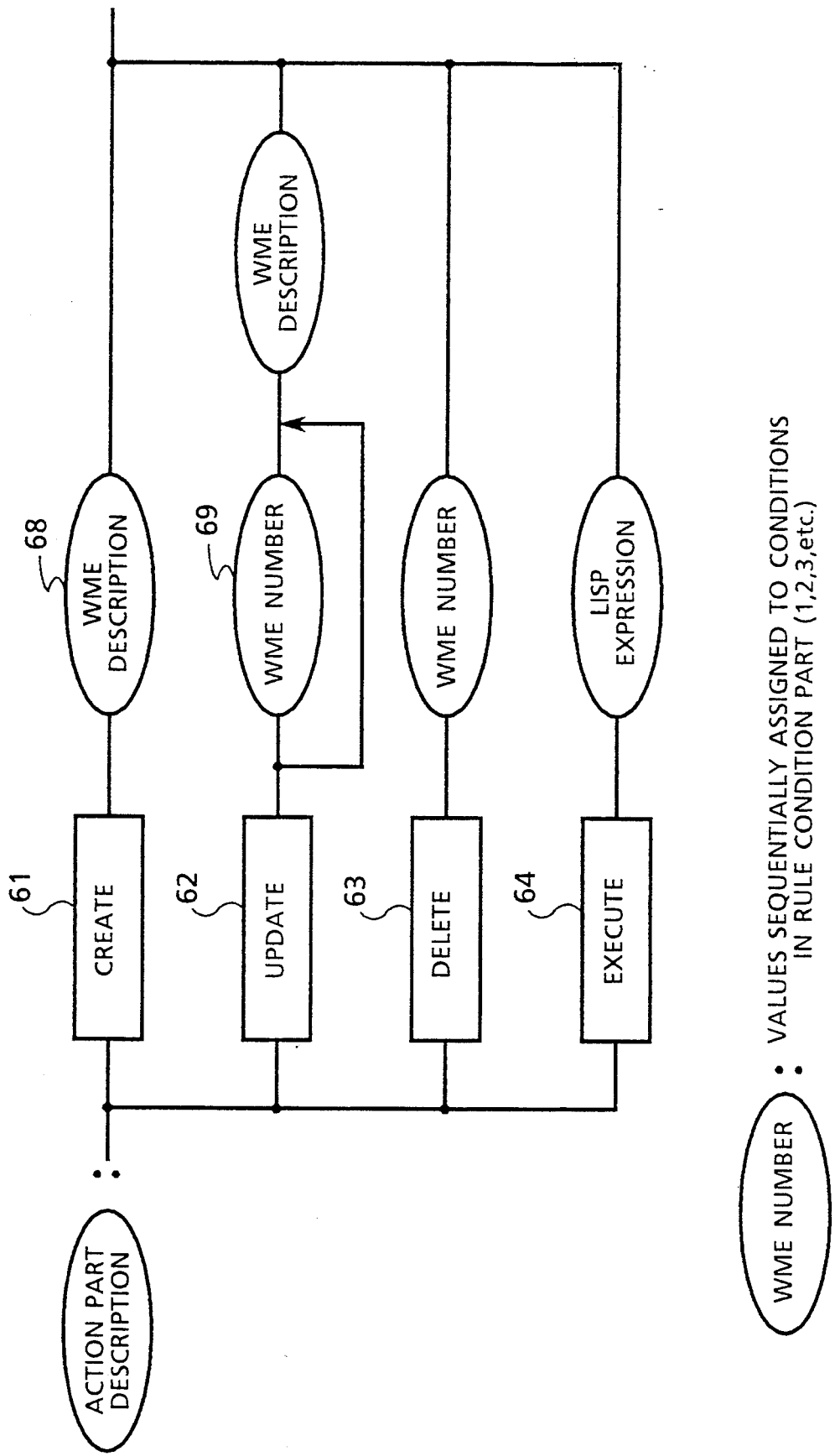

FIG. 8

```
    (R rule1
  /                            ,-85
81                            /
     IF   (WME1  $attr1 = 20              ← COMPARE WITH CONSTANT
               $attr2<>$attr4             ← COMPARE WITH OTHER ITEM
               $attr3>=?val1  )           ← COMPARE WITH VARIABLE
82       (?WME  $attr1 =  ?val1
                $attr2 =  $attr3 )
                            `-86

THEN
         (CREATE (WME3  $attr1 1           ← GENERATE WME
83                      $attr2 ?val
                        $attr3 (plus ?val 10 )))   ← CALL LISP
                                                     EXPRESSION
         (UPDATE 1 (WME1 $attr1 $attr5     ← UPDATE WME
                         $attr2 (* 10 ?val )))
         (DELETE 2 )                       ← DELETE WME
         (EXECUTE ( princ "rule1 is executed" ))  ← EXECUTE LISP
                                                    FUNCTION STRUCTURE
    /     ([ {1} {2} ] )                   ) ← SPECIFY TREAT TYPE
84        (
          87
```

FIG. 9

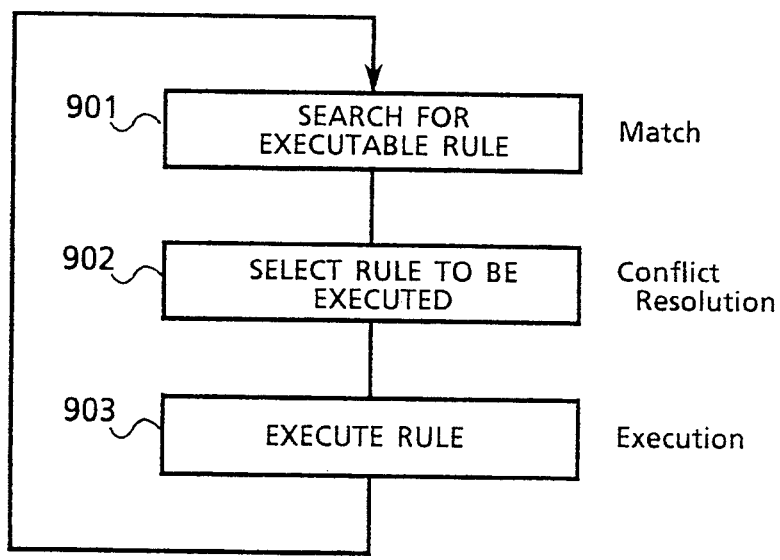

FIG. 10

```
RULE 1  IF    {PUMP      $ TYPE = PO6   $ OUTPUT DESTINATION = ?X)  ─ CONDITION 1 (WME 1)
              (TURBINE   $$ TYPE = TO3  $ INPUT SOURCE = ?X         ─ 102
                                        $ DEVICE NAME = ?Y)          ─ CONDITION 2 (WME 2)
              (FAILURE   $ DEVICE NAME = ?Y)                         ─ CONDITION 3 (WME 3)
    103 ─ THEN ...
          STRUCTURE [[[1][2]][3]]  ─ 104
```

```
RULE 1   IF    (PUMP      $ TYPE = PO6  $ OUTPUT DESTINATION = ?X)
               (TURBINE   $ TYPE = TO3  $ INPUT SOURCE = ?X)          } 101
         THEN
         STRUCTURE [[1][2]]

RULE 1   IF    (PUMP      $ TYPE = PO6  $ OUTPUT DESTINATION = ?X)
               (TURBINE   $ TYPE = TO3  $ INPUT SOURCE = ?X
                                       $ DEVICE NAME = ?Y)            } 102
               (FAILURE   $ DEVICE NAME = ?Y)
         THEN
         STRUCTURE [[[1][2]][3]]
```

INFERENCE METHOD AND APPARATUS FOR USE WITH KNOWLEDGE BASE SYSTEM AND KNOWLEDGE BASE SYSTEM SUPPORT METHOD AND APPARATUS USING THE INFERENCE METHOD AND APPARATUS

BACKGROUND OF THE INVENTION

The present invention relates to an inference method and an inference apparatus for use with a knowledge base system, and in particular, to an inference method and an inference apparatus for use with a knowledge base system and knowledge base system support method and system using the inference method and apparatus.

Conventional knowledge base systems have been suffered with a problem of a low inference or reasoning speed. Processing to judge a rule condition takes a long period of time for determination of satisfaction or dissatisfaction of the condition, which leads to inefficiency of the inference processing.

In order to overcome this difficulty, for a higher-speed reasoning, many knowledge engineering tools adopt a RETE algorithm or a TREAT algorithm to improve efficiency of the condition judge processing (pattern matching processing).

According to these algorithms, the judge processing is accomplished on a rule condition part based on a discrimination network in which each condition of the rule condition part is represented by a node.

With the provision of the discrimination network, identical conditions employed in a plurality of rules can be shared therebetween so as to express the conditions by a node. That is, the same condition judgement need not be duplicated.

In addition, intermediate results of condition judge operations conducted in the discrimination network can be memorized therein. Due to the memorized information, a condition judgement on data or a frame of data whose state has not been altered can be skipped. Namely, a result of the condition judgement can be replaced with an associated intermediate result retrieved from the discrimination network. Consequently, the condition judge processing is required to be executed only for data or a frame of data having a changed state thereby accomplishing the condition judgements on all condition parts of the respective rules.

In short, the operation range of the condition judgement can be limited, namely, the judge processing need be achieved only for data or a frame of data associated with the state which has been changed through an inference execution.

As described above, the rule condition parts are transformed into a discrimination network to keep therein intermediate results of condition judgements executed in the past. This consequently improves efficiency of the pattern matching operation and hence has been broadly used in many knowledge engineering tools.

A description of the conventional RETE algorithm is set forth an article entitled, RETE : A Fast Algorithm for the Many Pattern/Many Object Pattern Match Problem, Artificial Intelligence, Vol. 19, No. 1, pp. 17–37 (1982). For greater details regarding the TREAT algorithm, reference can be made to the article entitled, Treat: A Better Match Algorithm for AI Production Systems, AAAI-87, pp. 42–47 (1987).

In the conventional methods above, in a case of judgement on a complex condition related to many frames, there has been a problem of a considerable deterioration in the processing efficiency in association with the storage amount and range of the intermediate results of the condition judge processing First, a description will be given of a difference of the storage range of intermediate results of the condition judgement between the two typical algorithms, namely, RETE and TREAT algorithms.

In general, conditions forming condition parts of rules can be classified into two types, namely, conditions astriding a plurality of frames and conditions which can be judged within a frame, which are called inter-conditions and intra-conditions, respectively. According to the RETE algorithm, a set of a frame satisfying an intra-condition and frames satisfying an inter-condition are stored as an intermediate result of a condition judge operation. On the other hand, in accordance with the TREAT algorithm, only the frame satisfying the intra-condition is memorized as an intermediate result of the condition judgement.

That is, the difference between these algorithms resides in whether or not the frames satisfying the inter-condition are to be stored.

As above, when the judgement is conducted depending on the RETE algorithm, there is stored a processing history up to a point where the inter-condition is satisfied. Consequently, for an inter-condition of which an intermediate result has been memorized, the condition judge processing is not necessary unless a state quantity of any frame related thereto has been altered. However, since an inter-condition is associated with a group of frames, a large amount of computations are required for storing and for controlling the intermediate processing results. In consequence, when the store information is not effectively utilized, the processing efficiency is considerably lowered.

In this regard, according to the TREAT algorithm, the processing history attained when the inter-condition is satisfied is not memorized, thereby coping with the problem above. On the other hand, however, the judgement of the inter-condition is required to be accomplished for each operation to compute an intermediate result. In consequence, in accordance with the TREAT algorithm, a problem of the RETE algorithm that the processing efficiency is remarkably deteriorated can be removed. However, conversely, for a problem which is effectively processed according to the RETE algorithm, the processing efficiency is considerably reduced when the TREAT algorithm is used.

The difference between the RETE and TREAT algorithms resides in the degree of the past processing results to be stored, namely, the length of the past processing results that are stored for future utilization. In consequence, the effectiveness of each algorithm is determined as follows. The algorithm selection is to be achieved depending on whether or not a system in which a re-execution of a condition judgement is achieved is more effective as compared with a system where the historical information is stored; or, conversely, whether or not a system using the results of the past processing develops a higher-speed processing as compared with a system where a condition judgement is re-executed.

However, the degree or amount of historical intermediate results of the condition judgements are decided according to characteristics of a problem associated therewith. That is, for a certain kind of problem, the intermediate results are preferably stored; whereas, for another kind of the problem, it is desirable not to memorize the intermediate results.

Furthermore, there may be considered a case where even in a rule condition description, for a portion (a sub-pattern) of a condition part, it is effective to memorize an intermediate result of processing, whereas a re-computation is favorable for the remaining portion thereof.

In consequence, in the method of the prior art wherein the storage range of the intermediate results of the condition judge processing is fixed, a rule description having an appropriate storage range of the intermediate results can be processed with a high efficiency, whereas the processing efficiency is conversely reduced for a rule description specified with an inappropriate storage range.

It is therefore an object of the present invention to provide an inference method and an inference apparatus for use with a knowledge base system and a support system and a support apparatus for use with a knowledge base using the inference method and apparatus, that avoids the disadvantages of the prior art.

SUMMARY OF THE INVENTION

It is an object of the present invention to provide an inference method and an inference apparatus for use with a knowledge base system capable of achieving an efficient inference or reasoning based on a complicated and large-sized knowledge base system and a support system and a support apparatus for use with a knowledge base using the inference method and apparatus.

In order to achieve the object above, according to one aspect of the present invention, there are provided an inference method and an inference apparatus for use with a knowledge base system using rules, each rule including a condition description part defining a plurality of states identified as "frames" representing an object and constituting an object world under consideration with at least one pair of a slot and a value thereof associated with each frame, and an operation description part defining an operation to be executed when the condition is satisfied wherein a rule, for which a condition of a condition description part thereof is satisfied, is effected according to an operation included in an operation description part thereof. The invention achieves an inference or a reasoning characterized by including a specification of a sequence of judgements for conditions related to the respective frames of the rule condition description part, designating whether or not a memory is loaded with information associated with a processing result obtained from the condition judge processing of each frame, and conducting the condition judgement for each frame of the condition description part based on the processing result stored in the memory according to the specified sequence.

That is, in accordance with the present invention, the processing sequence structure of the condition judgement is optimized to increase the reasoning speed by selectively adopting the following functions.

(1) User's specification function of processing sequence structure

This function allows the user to specify a sequence of condition judgements for satisfaction or disatisfaction of conditions and to specify a storage for an intermediate result attained by each condition judgement (moreover, preferably, a range of intermediate results to be stored).

In addition, there is disposed a function in which the specification of the processing sequence structure is described in the rules such that the rules are subdivided into three parts i.e. a condition part, a result or conclusion part, and a processing sequence structure description part so as to describe in the processing sequence structure specification part the specification of the sequence of the condition judgements and the storage specification of the intermediate results obtained by the condition judgements (furthermore, preferably, the range specification of the intermediate results to be stored is also specified therein).

Moreover, each condition related to each frame constituting the rule condition part is assigned with an identification name so that the condition judgement sequence is specified according to a list structure including the identification name as an element thereof.

In addition, in order to specify, by use of the list, the storage of the intermediate results of the condition judgements and the intermediate result storage range at the same time, symbols e.g. parentheses are used for discrimination therebetween.

(2) Support function to help user specify processing sequence structure

This function is implemented by a monitor mechanism or unit (data logging unit or mechanism) of the condition judge processing for gathering information necessary for the processing sequence structure specification. A log display mechanism is used for displaying the collected information.

The monitor mechanism is employed to collect information such as a probability of satisfaction of each condition and effectiveness of a stored intermediate result. The log display mechanism is disposed to display a sequence of condition judgements in a tree form or structure with the condition satisfaction probability, effectiveness of the presented intermediate result. etc.

(3) Function to obtain an optimal processing sequence structure from typical examples This function is used as follows. Typical examples are specified such that a processing process of the condition judgements in an inference operation is analyzed for each example so as to automatically determine a specification of an optimal condition judgement sequence, a storage specification of intermediate results attained by the condition judgement, and a specification for the storage range.

(4) Function to dynamically charge the processing sequence structure during an inference execution This function operates as follows. During an inference execution, the condition judge processing is monitored to attain an optimal processing sequence structure. When the structure is different from a processing sequence structure being adopted at the point of time, an automatic structure replacement is accomplished to employ the optimal processing sequence structure so as to continue the condition judgement. This function is initiated at a predetermined interval of time.

According to the present invention, there is disposed a function for specifying a sequence of condition judgements, for designating storage of intermediate results attained by the condition judge processing, and for denoting a range of each intermediate result to be stored, thereby identifying the condition judge processing most suitable for a property (or nature) of a problem as an object of the inference.

Moreover, the specification for a processing sequence structure can be easily described in a list form utilizing two kinds of parentheses as constituent parts of rules. In addition, there is disposed a function to collect and to display information necessary for the structure sequence specification, which mitigates the user's load required for the specification of the processing sequence structure.

Furthermore, with the provision of the function in which the user designates typical problems such that the system analyzes a process of the condition judgements in an inference of each problem so as to automatically obtain an optimal processing sequence structure, the user need not specify a processing sequence structure. Namely, only by specifying typical examples, an optimal processing sequence structure can be attained.

In addition, there is disposed a function which analyzes a process of the condition judgements during an inference execution to determine an optical processing sequence structure such that when the structure is different from a processing sequence structure being used, the current structure is automatically replaced with the optimal processing sequence structure. With this provision, also for a problem in which the optimal processing sequence structure changes during the reasoning operation, the inference processing can be conducted with a high efficiency.

BRIEF DESCRIPTION OF THE DRAWINGS

The foregoing and other objects, advantages, manner of operation and novel features of the present invention will be understood from the following detailed description when read in connection with the accompanying drawings wherein:

FIG. 2 is an explanatory diagram useful to explain syntax of contents the working memory element (WME) in the embodiment according to the present invention;

FIG. 3 is a diagram illustratively showing a description example of the frame or a WME in the embodiment according to the present invention;

FIG. 4 is a schematic diagram showing a basic structure of rules in the embodiment according to the present invention;

FIG. 5 is a diagram showing syntax of a condition clause;

FIGS. 6A and 6B are diagrams illustratively showing syntax of action or execution parts, respectively;

FIG. 8 is a diagram showing an example of rule description in the embodiment according to the present invention;

FIG. 9 is a flowchart showing a reasoning operation executed by an inference mechanism or engine of the embodiment according to the present invention;

FIG. 10 is a diagram showing an example of rules in the embodiment according to the present invention;

FIG. 18 is a diagram showing an example of two rules in an alternative embodiment according to the present invention.

DESCRIPTION OF THE PREFERRED EMBODIMENTS

Figure 1:
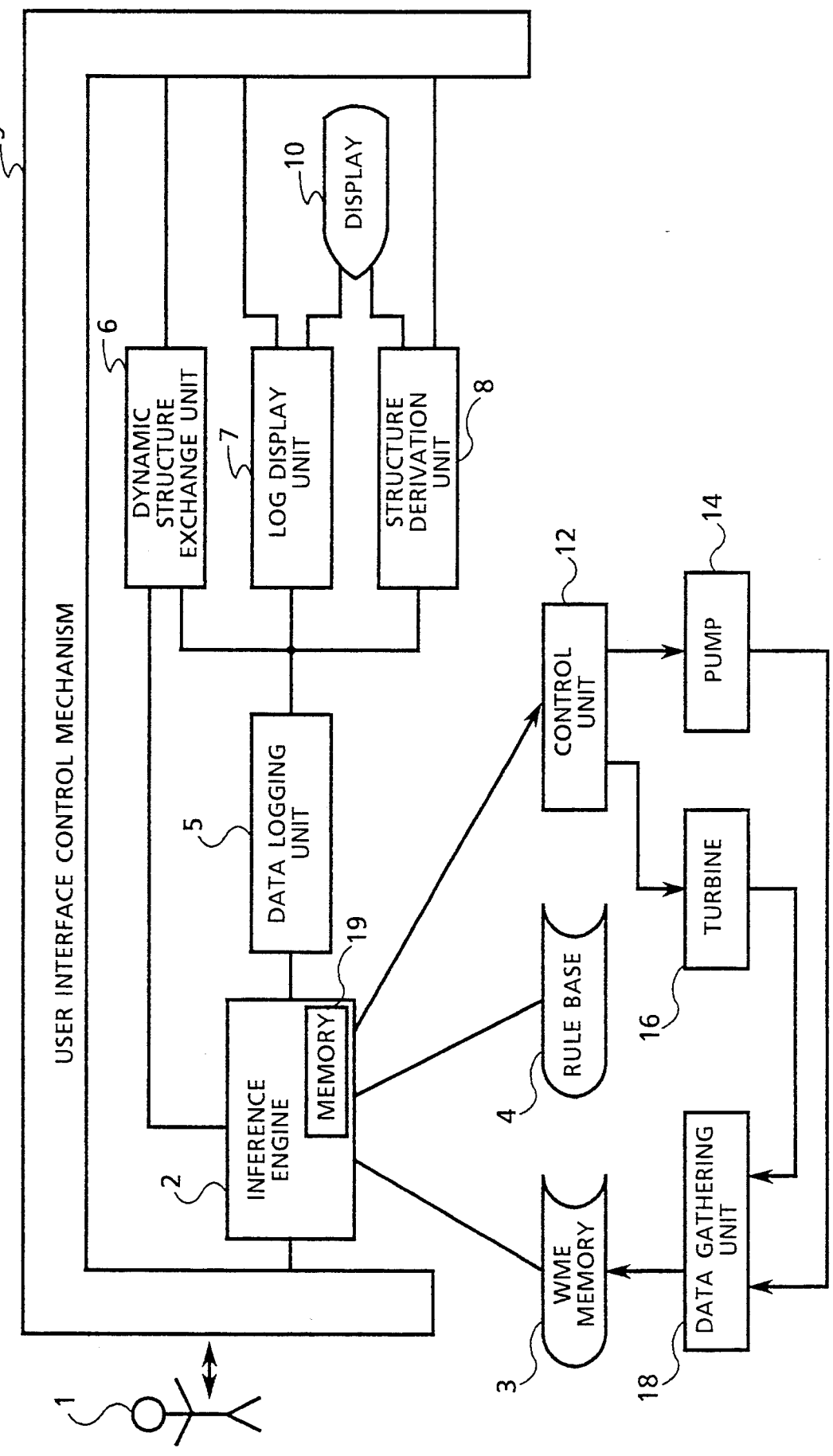
FIG. 1 is a block diagram schematically showing a knowledge data base system in an embodiment according to the present invention.

Referring now to the drawings, a description will be given of preferred embodiments of an inference method and an inference apparatus for use with a knowledge base system according to the present invention.

FIG. 1 is a block diagram showing a knowledge base system in an embodiment according to the present invention. In the knowledge base system in this embodiment, the present invention is applied, by way of example, to a failure diagnosis of a power plant system.

The knowledge base system comprises an inference engine 2, a working memory element (WME) or a frame memory 3 for storing therein a plurality of working memory elements or frames, a rule base 4 loaded with rules, a data logging unit or a log gathering mechanism or unit 5, a dynamic structure exchange unit or replacement mechanism 6, a log display mechanism or unit 7, a structure derivation mechanism or unit 8, a user interface control mechanism or unit 9, a display 10 such as a cathode ray tube (CRT), a control unit 12, a power generation pump 14, a turbine 16, and a data gathering unit 18. In this diagram, for simplification of description, the power plant system includes only the pump 14 and the turbine 16. The control unit 12 is disposed to control the pump 14 and the turbine 16 based on an inference result supplied from the inference engine 2. The data gathering unit 18 collects information such as data denoting states of the pump 14 and the turbine 16, for example, a failure state therefrom and then passes the data to the WME memory 3.

In this embodiment, a user 1 of the knowledge base system carries out a conversational operation via the user interface control mechanism or section 9 with the inference engine 2, the dynamic structure exchange mechanism or unit 6, the log display unit 7, and the structure derivation unit or decision mechanism 8.

Moreover, the inference engine 2 accesses the contents of the WME memory 3 and knowledge loaded in the rule base 4 to sequentially execute rules of which rule condition parts are satisfied. In this connection, the rules are described in a programming language e.g. LISP.

Subsequently, a description will be given of the method of describing data of the working memory element (WME) and the rules and the functions of the respective mechanisms or units.

First, the WME description method will be described.

FIG. 2 is a diagram for explaining syntax associated with the WME in the embodiment according to the present invention.

The WME of the embodiment is represented by a set including a capital letter "W" enclosed with parentheses 21 and 25, a WME name 22, an item name 23, and a value 24.

FIG. 3 shows a description example of the WME in the embodiment according to the present invention.

The configuration of this embodiment includes a WME name "WME1" 31 and data pairs 32 to 34 each comprising a $item name and a value. The pair 32 designates that an item "attr1" is assigned with a value "123". Similarly, the data pairs 33 and 34 respectively denote that items "attr2" and "attr3" have values "abc" and "text data", respectively.

Next, the rule description method will be described.

FIGS. 4, 5, 6A, 6B, 7A, and 7B are diagrams for explaining syntax of rules in the embodiment according to the present invention.

The basic structure of the rules of the embodiment comprises, as shown in FIG. 4, a rule name part 41, a condition part 42, an action or execution part (a result or conclusion part) 43, and a processing structure description part 44.

The condition part 42 is constituted with a list of condition clauses representing conditions for WME.

Moreover, the action or execution part 43 includes a generation, a deletion, or an update of the WME and a call of a function which can be described by LISP, for example.

In addition, the processing sequence structure description part 44 comprises a specification of a sequence of condition judgements, a specification indicating whether or not an intermediate result of each condition judgement is to be stored, and a specification of a storage range.

That is, there is disposed in this embodiment the processing sequence structure description part 44 in addition to the rule name part 41, the condition part 42, and the action part 43, which have been adopted in ordinary production systems.

FIG. 5 shows the syntax of condition clauses or conditions described in the condition part 42.

According to the embodiment, a condition clause is used to describe conditions for a frame or a WME. The condition clause includes a condition description constituted with an objective WME name or a variable 51 and a condition to be satisfied by the item value, which is represented by a set of three items i.e. an item name 52, a comparison or relation operator 53, and a value, an item name, or a variable 54. In this connection, a WME is an object constituting an object world. For example, an object "turbine" is represented by at least one pair of a slot and a value thereof. For example, the slot and the value thereof are designated as a $type and P06, respectively.

Incidentally, a variable is expressed by an atom having a question mark "?" as the first character thereof. An identical character variable is assumed to be assigned with the same value. Moreover, the comparison or relation operators include "=", "<>", ">", "<", ">=" and "<=".

Figure 6B:
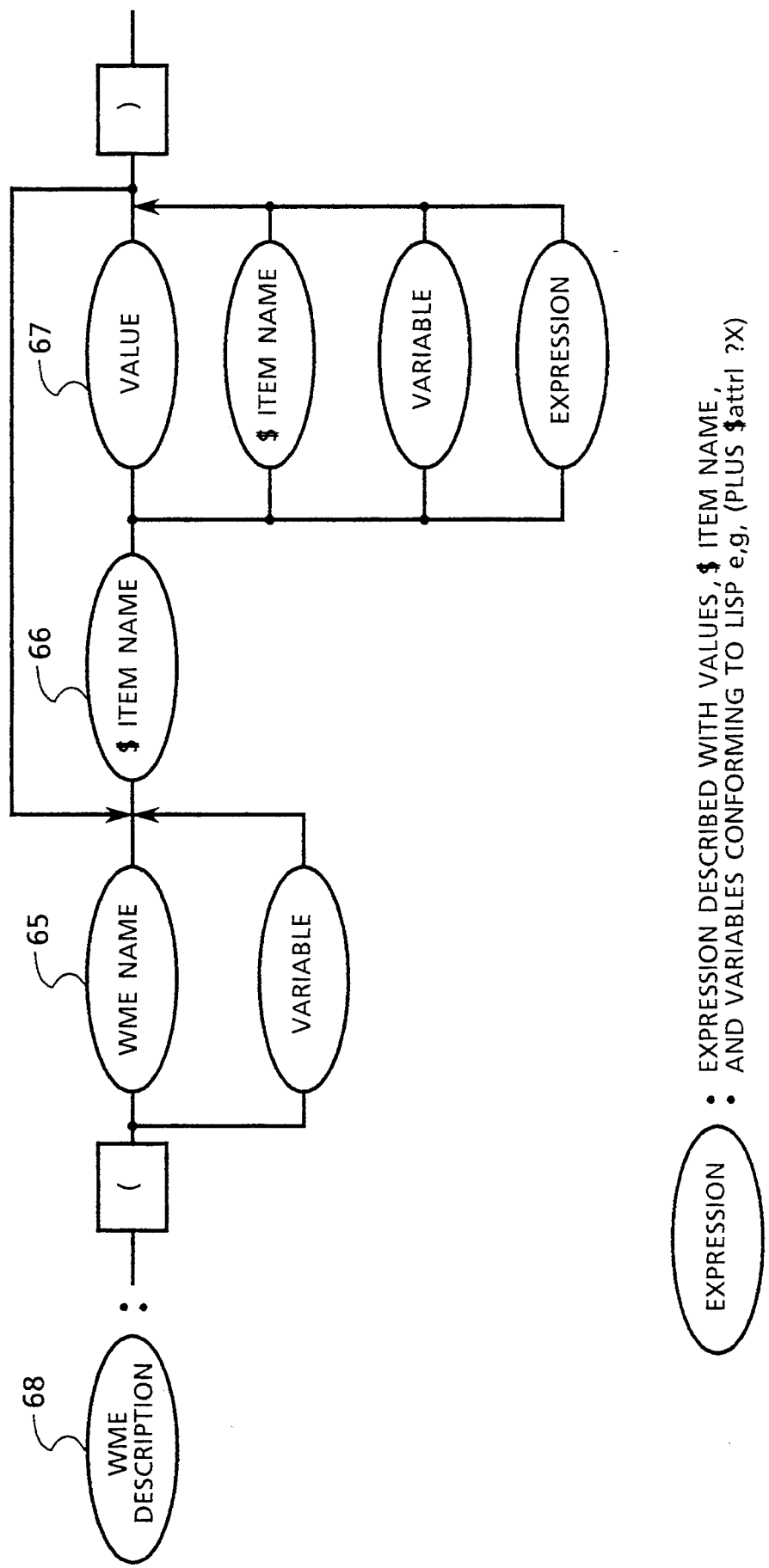

Moreover, FIGS. 6A and 6B show the syntax applied to the description of the action or result part 43.

In this embodiment, as shown in FIG. 6A, there can be described four kinds of commands i.e. CREATE 61 for generating a WME, UPDATE 62 for updating the WME, DELETE 63 for deleting the WME, and EXECUTE 64 for calling a function.

When the CREATE command 61 is executed, a WME is produced according to the WME description 68. The WME description 68 is effected according to syntax almost similar to the syntax associated with the WME of FIG. 2. As shown in FIG. 6B, a WME is specified by a WME name or a variable 65; thereafter, an item name 66 and a value thereof are repeatedly described.

When the UPDATE command 62 is executed, a WME specified by the WME number 69 is updated. The WME numbers (1, 2, 3, etc.) are sequentially assigned beginning from a WME number "1" to condition clauses or conditions described in the rule condition part. For example, in the case of "UPDATE 2 . . . " where WME number 69 is "2", a WME satisfying the second condition is to be updated.

When the DELETE command 63 is executed, a WME denoted by the WME number 69 is deleted. For example, "DELETE 2" indicates that a WME satisfying the second condition is to be deleted.

The EXECUTE command 64 is used to execute a function, for example, to evaluate a LISP expression.

Figure 7A:
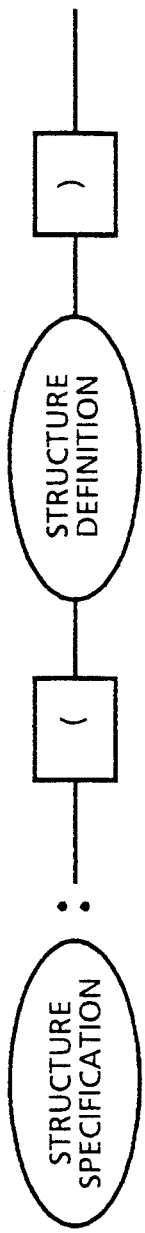
FIG. 7A is a diagram showing a structure specification in a processing sequence structure description part.
Figure 7B:
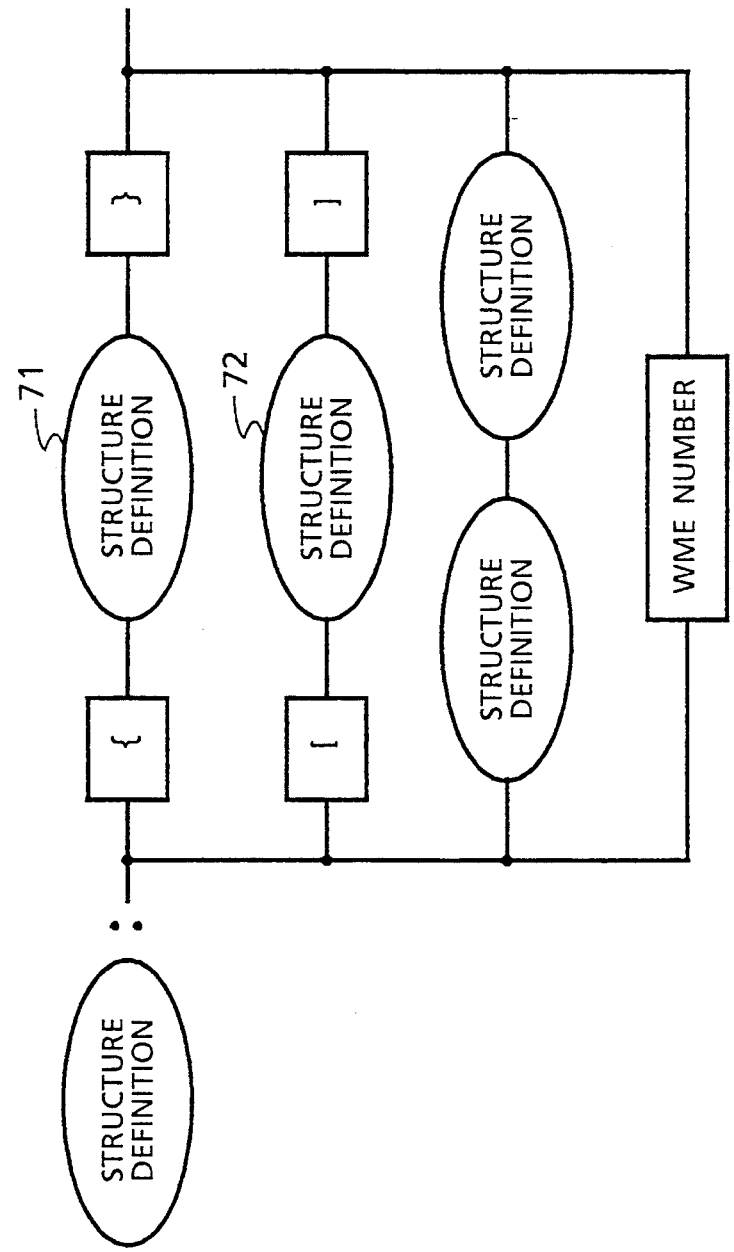
FIG. 7B is a diagram schematically showing a structure definition of the processing sequence structure description part.

In addition, FIGS. 7A and 7B show syntax related to contents of the processing sequence structure description part 44.

In this embodiment, the structure specification in the processing sequence structure description part 44 includes a structure definition as shown in FIG. 7A. The structure definition is represented by a kind of list including the WME numbers as elements thereof and two kinds of symbols ("{", "}", "[", and "]") 71 and 72 as shown in FIG. 7B. In this connection, the structure specification will be described later in detail.

FIG. 8 shows an example of a rule description in the embodiment according to the present invention.

In this embodiment, the rule description includes a rule "rule1" 81 constituted with a condition part 82 comprising two conditions 85 and 86, a result part 83 including four commands, and a processing sequence structure description part 84 designating a list 87.

The first condition 85 of the condition part 82 indicates e condition that for an WME having a name "WME1", an item "attr1" thereof has a value equal to 20, an item "attr2" thereof possesses a value not identical to a value of an item "attr4", and an item "attr3" thereof has a value not below a value of a variable "?val1". In this regard, the value of the variable "?val1" is determined by the second condition 86.

On the other hand, the second condition 86 denotes a condition that for an WME having a name "?WME", an item "attr1" thereof has a value equal to a value of the variable "?val1" and an item "attr2" thereof has a value identical to a value of an item "attr3".

In this case, since the WME name is equal to a variable "?WME", the condition judgement is accomplished for all WMEs.

Incidentally, the reference numerals 83, 84, and 87 respectively designate an action part, a processing sequence structure description part, and a structure definition.

Subsequently, a description will be given of a method of implementing the inference engine 2.

FIG. 9 shows a flowchart of an inference processing executed by the inference engine 2 of the embodiment according to the present invention.

The inference engine 2 of this embodiment conducts a reasoning operation based on a processing flow similar to one employed in a production system.

That is, as shown in FIG. 9, the inference engine 2 searches through the contents of the rule memory 4 to attain all rules for which condition parts thereof are satisfied, namely, executable rules (step 901). Thereafter, a rule to be executed is acquired therefrom (step 902) and then a command contained in a result part of the rule is executed (step 903). The operation cycle above is repeatedly performed for all executable rules.

Among these processing steps, the step 901 searching for all rules associated with condition parts satisfied requires the largest amount of processing. According to the embodiment, in order to increase the speed of this matching operation 901, the rule condition part is converted into the form of a discrimination network such that the condition judge processing is carried out based on the discrimination network and intermediate results of condition judgements kept in the network.

Figure 11:
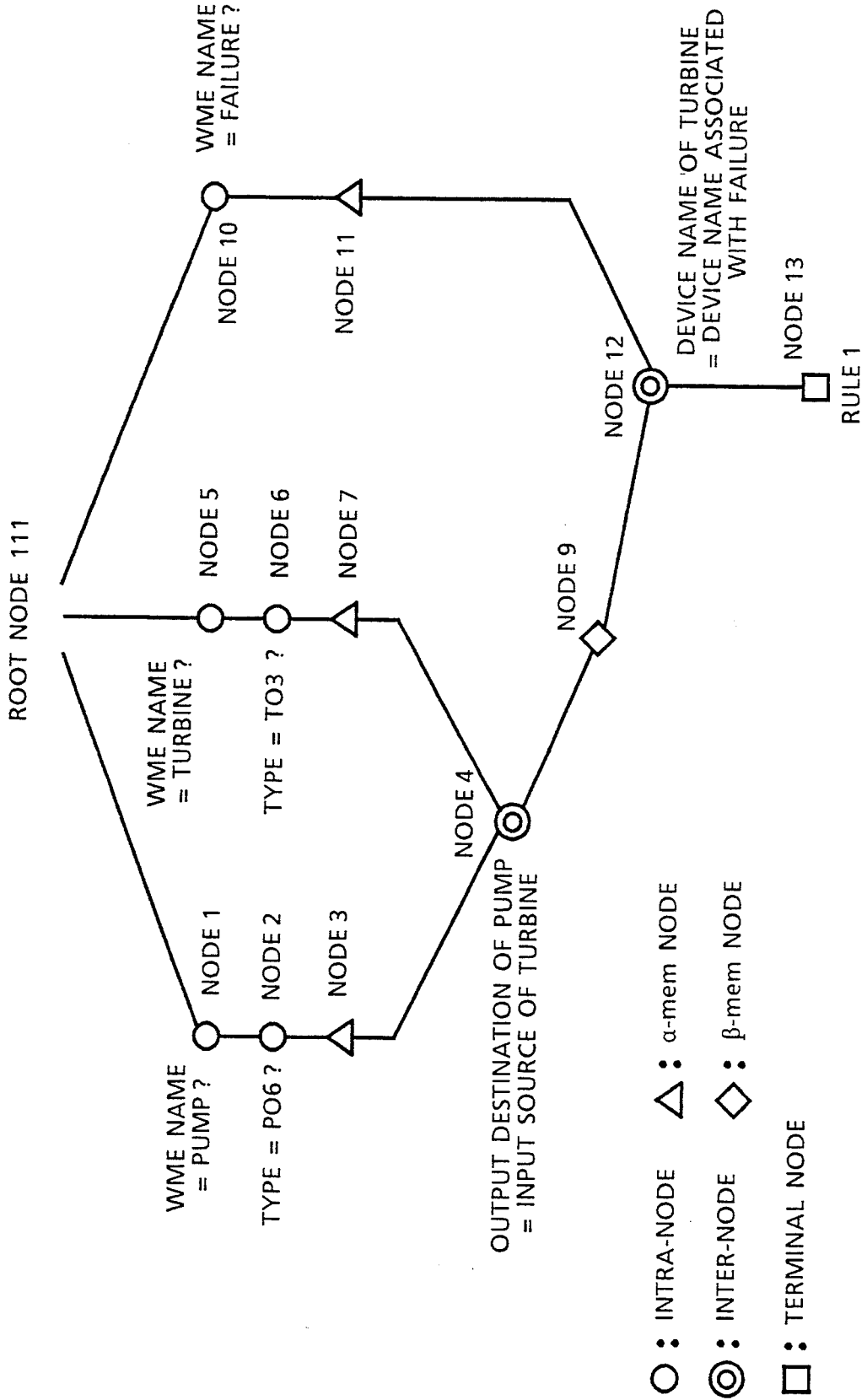
FIG. 11 is a diagram showing an example of a discrimination network in the embodiment according to the present invention.

FIGS. 10 and 11 show an example of the basic condition judge method adopted in the matching processing of this embodiment.

FIG. 10 shows an example of a rule condition part in the embodiment according to the present invention, whereas FIG. 11 is a discrimination network example used in the embodiment. This network is produced by transforming the contents of the condition part of FIG. 10.

The condition part of FIG. 10 includes a condition 102 of a rule 1, a result part 103 of the rule 1, and a processing sequence structure 104 thereof.

In this embodiment, when achieving a condition judgement of the rule of FIG. 10, the inference engine 2 transforms the contents of the condition part of FIG. 10 into a discrimination network of FIG. 11 according to the contents of the processing sequence structure description part associated with the rule. The obtained network is then stored in a memory 19 disposed in the inference engine 2. In this connection, the transformed discrimination network may be loaded in the rule base 4 to be read therefrom into the inference engine 2 when the condition judgement is accomplished.

In FIG. 11, a circle "◯" called an intra-node designates a condition in a WME. This applies, for example, to such conditions as "WME name is pump?" and "$type is P06?".

Moreover, a symbol "◉" called an inter-node denotes a condition between different WMEs. For example, a condition "$output destination of pump is identical to $input source of turbine?" expressed with a variable ?X is represented by an inter-node.

Furthermore, in an α-mem node and a β-mem node respectively denoted by "Δ" and " " (to be collectively called memory nodes), the system memorizes WMEs received therein as intermediate results of the condition judgements. In this connection, the α-mem node stores a list including one WME, whereas the β-mem node memorizes a list comprising two or more WMEs. The intermediate results are stored in the memory 19 of the inference unit 2.

According to the basic processing procedure of the discrimination network, the WME is passed from a root node to all branches. In each node, if a condition stored therein is satisfied, the WME is fed to the downstream nodes therefrom; otherwise, the processing is terminated. When the WME reaches a terminal node, it is judged that the rule condition part has been satisfied by the WME.

Let us assume here that the discrimination network is, for example, in an initial state (where the memory nodes are not loaded with any WMEs) and that WME1 (pump $type P06 $output destination T1) is read from the WME memory 3 into the inference engine 2 so as to pass the WME 1 to branches from a root node 111.

In this situation, the WME 1 is first received by a node 1, which conducts a condition judgement on "WME name=pump". As a result, since the condition is satisfied, the WME1 is sent to a node 2 subsequent to the node 1 so as to judge a condition "Type=P06". The condition is also satisfied and hence the WME1 is transferred to a following node 3, which stores the WME1 in the memory 19 of the inference engine 2.

On the other hand, a node 4 conducts a judgement "$output destination of pump=$input source of turbine" based on the WME1 currently being processed and a WME stored in the memory 19 by a memory node 7 used as an interface to the memory 19 and linked with a branch on the right of the inter-node 4. At the present point of time, since the memory node 7 is empty and hence cannot execute any processing, the system initiates a node 5 to resume the processing of the WME1.

The node 5 judges a condition "WME name=turbine", which results in that this condition is not satisfied. In consequence, a node 10 in another path is activated to restart processing the WME1, which similarly ends with dissatisfaction. Consequently, there does not exist any route for the processing of the WME1, namely, the processing of the W ME "pump" through the discrimination network is terminated at this point.

Subsequently, let us assume that WME2 (turbine $type Z $output destination P1 $device name turbine LX) is read from the WME memory 3 to be fed to the discrimination network.

In this case, like the WME1, the WME2 is judged by the node 1 resulting in dissatisfaction of the condition. This is also the case for processing results of the nodes 5 and 6. Thereafter, the node 7 stores the WME 2 in the memory 19 and then passes the WME2 to the node 4.

The node 4 judges a condition "$output destination of pump=$input source of turbine" based on the WME 2 under the current processing and a WME stored in the memory 19 by the memory node 3 coupled with a branch on the left of the inter-node 4. In the preceding cycle, the memory node 3 has stored the WME1 in the memory 19. Consequently, the condition judgement is accomplished depending on the WME1 and WME2. As a result, the condition is satisfied and a list (WME1, WME2) is created to be passed to the next node 9. Namely, the β-mem node 9 in turn stores the list in the memory 19. Since the node 11 has not been loaded with any WME, the processing of the node 12 fails, thereby terminating the processing of the WME2.

Here, let us assume that a failure occurs in the turbine 16. Data denoting the failure is supplied to the data gathering unit 18. In response thereto, the WME memory 3 produces WME3 (failure $device name turbine LX), which is then fed to the inference unit 2. For the WME3, the processing of the nodes 1 and 5 results in dissatisfaction of the condition; whereas, the processing of the node 10 leads to satisfaction thereof so as to transmit the WME3 to the node 11. The node 11 consequently memorizes the WME3. Moreover, the node 12 judges a condition $device name of turbine=$device name related to failure" based on a list (WME1, WME2) memorized in the memory node 9. In this situation, since the condition is satisfied, a list (WME1, WME2, WME3) is created to be passed to the node 13, which then adds the list to a conflict set. That is, it is determined that the list (WME1, WME2, WME3) is an instantiation of the rule 1.

In other words, at this point of time, the rule 1 becomes executable.

In consequence, the processing sequence structure description part 104 is loaded with the data items as shown in FIG. 10. Details about the contents of the list will be described later in conjunction with FIG. 13. The failure diagnosis is thus carried out for the turbine 16. In consequence, when the diagnosis decides a failure of the turbine 16, there can be accomplished an operation to be executed according to the description of the action part, for example, the turbine failure is displayed and the turbine 16 is stopped.

Figure 12:
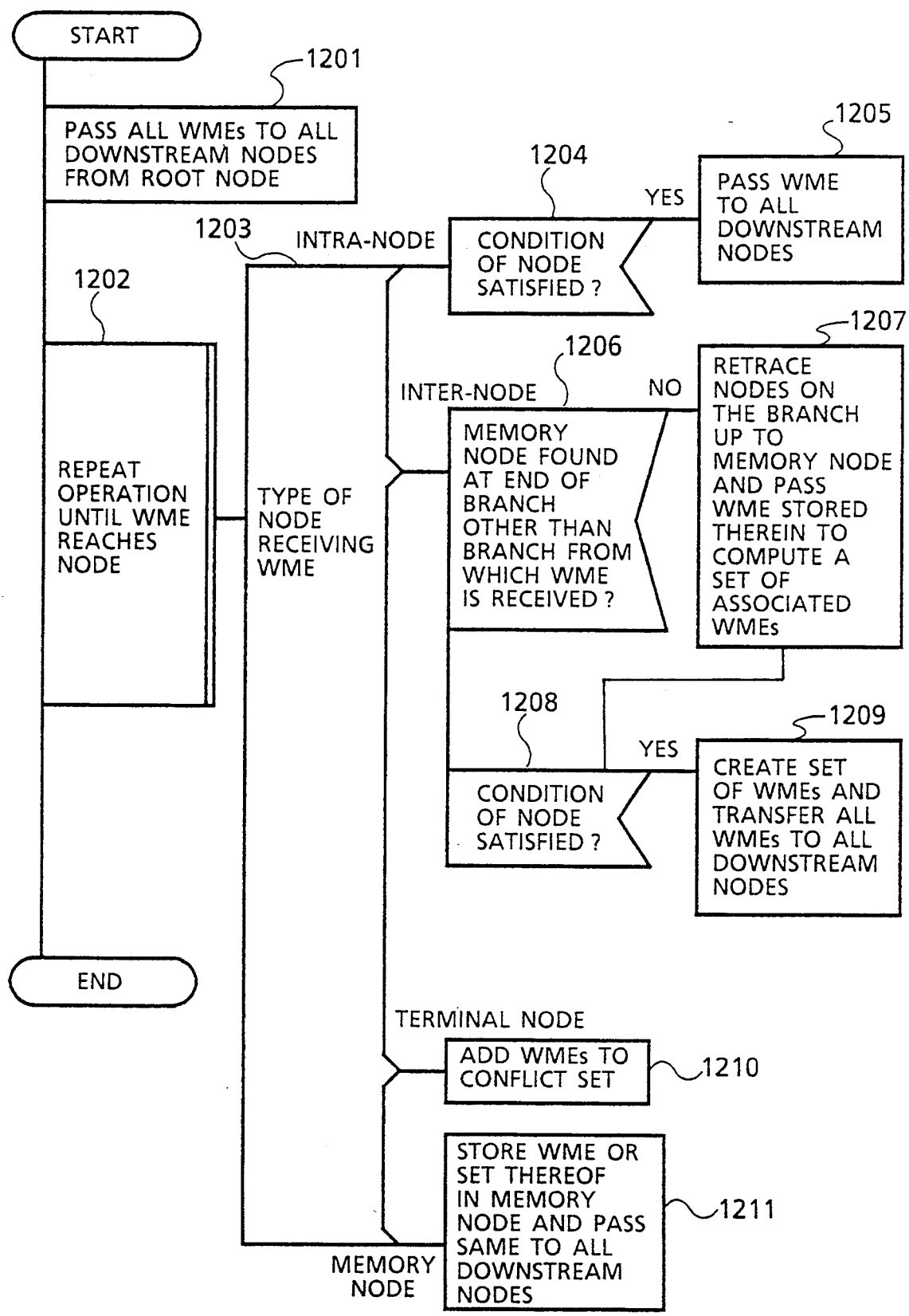
FIG. 12 is a flowchart showing the operation of the discrimination network in the embodiment according to the present invention.

The overall processing procedure of the discrimination network above can be summarized as shown in FIG. 12.

This diagram is a flowchart of the processing achieved by the discrimination network in the embodiment according to the present invention.

According to the processing flow of this embodiment, all WMEs are passed from the root node to all nodes subsequent thereto (steps 1201 and 1202). The node having received the WME is then checked for decision of a type of the node (step 1203). For an intra-node, a condition judgement is achieved for satisfaction or dissatisfaction of the condition (step 1204). If the condition is satisfied, the WME is further sent to all downstream nodes therefrom (step 1205).

For an inter-node, the system accesses a set of WME information stored in a memory node on an input branch other than the branch from which the pertinent WME has been received so as to conduct a condition judgement based on the obtained information (step 1208). If the condition is satisfied, a new set of WME information is created to be transferred to the downstream nodes (step 1209).

In a case of a terminal node, the received WME or the received set of WMEs is added to the conflict set (step 1210).

In addition, in a case of a memory node, the received WME or the received set of WMEs is stored in the memory node and is then passed to all downstream nodes (step 1211).

A description will be now given of meanings of lists stored in the processing sequence structure description part of the rule description and utilizations thereof in the condition judge processing.

Figure 13:
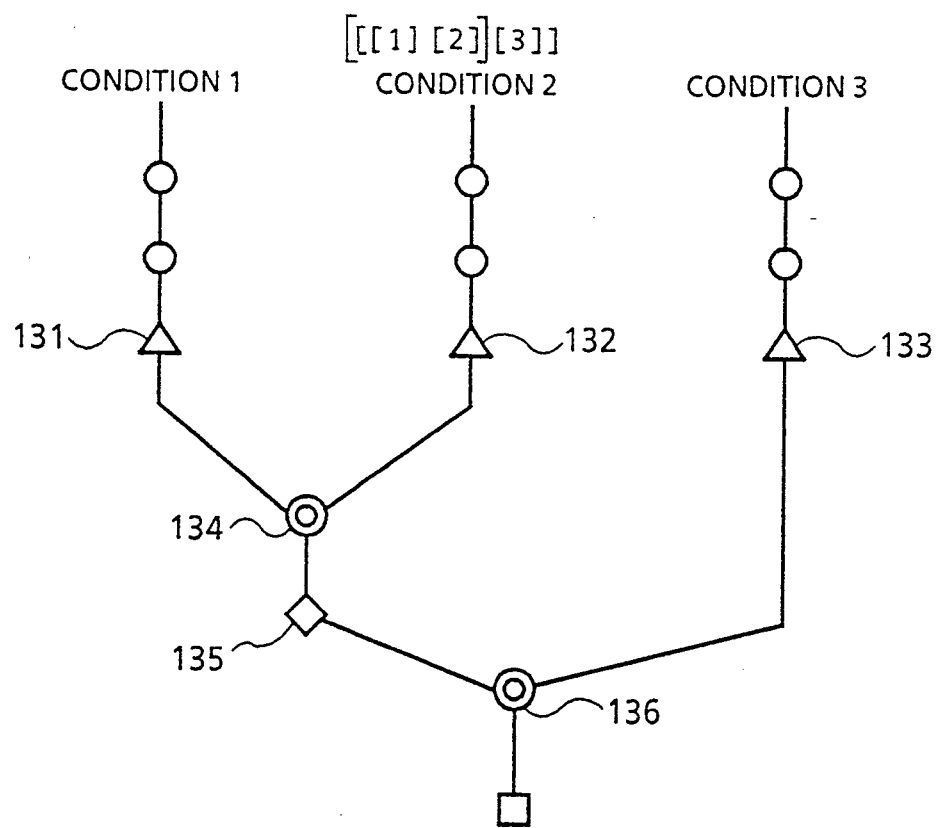
FIGS. 13 and 14 are diagrams respectively showing configuration examples of the discrimination network in the embodiment according to the present invention.
Figure 14:
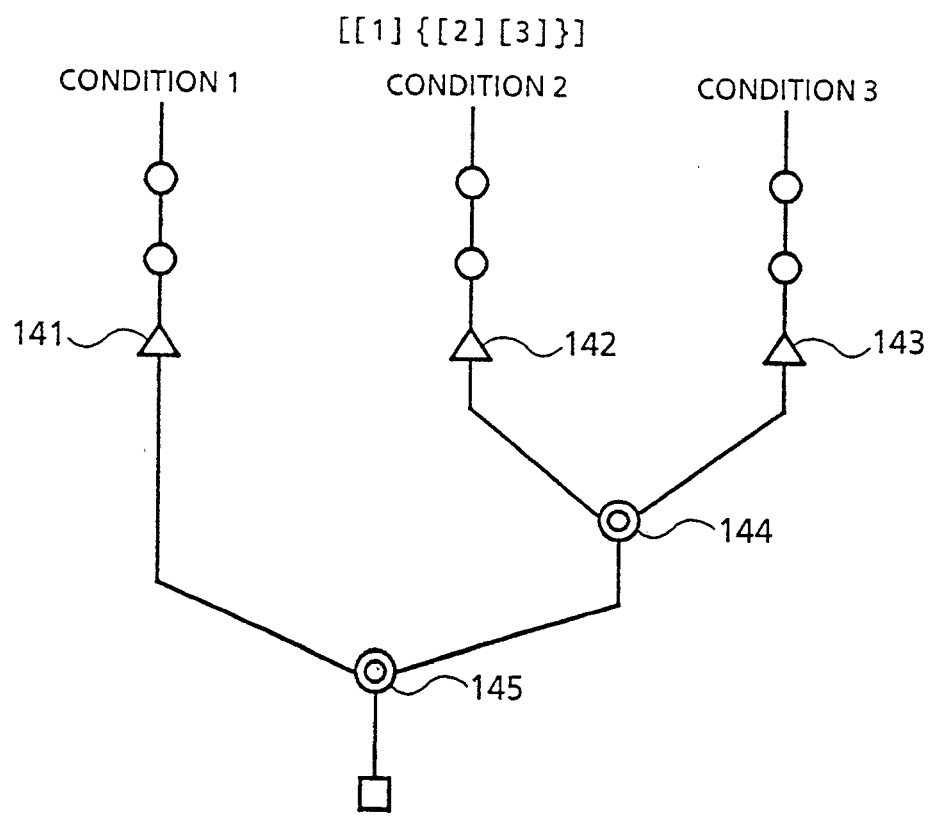

FIGS. 13 and 14 show discrimination network examples adopted in the embodiment according to the present invention.

As shown in FIGS. 7A and 7B, a structure specification is represented by a kind of list including WME numbers as elements thereof and two types of symbols e.g. two different parentheses "{", "}", "[", and "]".

In this regard, these two types of parentheses respectively have the following meanings. "{" and "}" : For a condition enclosed therein, a condition judge result is not memorized. "[" and "]": For a condition expressed therebetween, a condition judge result is memorized.

Thanks to the list, it is possible to represent an order of condition judgements (i.e. a sequence in which conditions are linked with each other according to inter-nodes) and a specification of storage for an intermediate result of the judge processing (namely, specification for generation of a α-mem node and β-mem node).

For example, for a specification

[[[1 ][2 ]][3 ]], the system produces a discrimination network as shown in FIG. 13, which is identical to the network of FIG. 11. That is, the list indicates an order of condition judgements in which a first condition is coupled with a second condition by an inter-node 134; thereafter, the resultant condition is linked with a third condition by an inter-node 136.

Furthermore, the list designates a specification of intermediate results of condition judge processing in which based on the description [1 ], [2 ], and [3 ], α-mem nodes 131, 132, and 133 are generated for the respective conditions 1, 2, and 3; moreover, depending on the description [[1 ][2 ]], a set of WMEs attained when the condition judgement results in a satisfaction in an inter-node for the first and second conditions is stored in the β-mem node 135.

For the specification

[[1 ]{[2 ][3 ]}], a discrimination network is created as shown in FIG. 14. Namely, according to the list denoting a sequence of condition judgements, the second and third conditions are linked with each other by an inter-node 144 and then the coupled condition is linked with the first condition by an inter-node 145.

Moreover, the list denotes a specification of the intermediate results of judge processing as follows. Namely, like in the example above, α-mem nodes 141, 142, and 143 are respectively produced for the associated conditions 1, 2, and 3. However, due to the specification {[2 ][3 ]}, an intermediate result developed when the condition judgement is satisfied in the inter-node 144 for the second and third conditions is not memorized; furthermore, a β-mem node is not generated between the inter-nodes 144 and 145.

As described above in conjunction with the examples of FIGS. 13 and 14, by changing arrangement related to inter-nodes, namely, by altering types and arrangements of the parentheses {, }, [, and ], the combination of intermediate results of condition judgements of the respective conditions can be varied.

As can be understood from the description above, a discrimination network is created from a condition part according to the specification of the processing sequence structure description part of the rules such that the inference engine judges the rule conditions based on the discrimination network.

In consequence, there may possibly exist a chance where the processing results developed in the past are missing. In such a case, the operation is carried out as shown in the processing steps 1206 and 1207 of FIG. 12.

That is, when a WME to be passed to the network reaches an inter-node, the system conducts a check, prior to a condition judgement, to decide whether or not there exists a memory node at an end of a branch other than the branch from which the pertinent WME is received (step 1206). If this is not the case, the path of the branch is retraced up to a memory node so that WME information stored therein is transferred to the downstream node, thereby creating a set of WMEs necessary for the condition judgement (step 1207).

Moreover, based on the generated WME, the condition is judged (step 1208). If the condition is satisfied, the WME is further fed to the downstream nodes (step 1209).

For example, in the discrimination network of FIG. 14, when a WME is delivered from a point of a condition 1, the WME reaches an inter-node 145. However, since the processing result of the inter-node 144 has not been memorized, WMEs stored in the memory nodes 142 and 143 are again passed to the downstream node to generate a set of WMEs matching a condition of the inter-node 144, thereby conducting the condition judgement in the inter-node 145 based on the created set of WMEs (steps 1206 and 1207 of FIG. 12).

Next, a description will be given of the functions of the data logging unit 5, the dynamic structure exchange section 6, the log display mechanism 7, the structure derivation unit 8, and the user interface control section 9 of FIG. 1.

Rules and WMEs supplied from the user via the user interface mechanism 9 are stored via the inference engine 2 or directly in the rule base 4 and the WME memory 3, respectively.

The inference engine 2 transforms, as described above, the condition part of the rules stored in the rule base 4 into a discrimination network to pass all WMEs of the WME memory 3 to the discrimination network, thereby achieving the condition judge processing. Moreover, the inference engine 2 executes rules for which related conditions are satisfied to conduct an inference or reasoning operation.

The data logging unit 5 monitors the process of the condition judge processing executed by the inference engine 2 according to the discrimination network of FIG. 12 to measure probability of condition satisfaction in each of the intra-nodes and inter-nodes and to count the number of reference operations for each list stored in each memory node.

Figure 15:
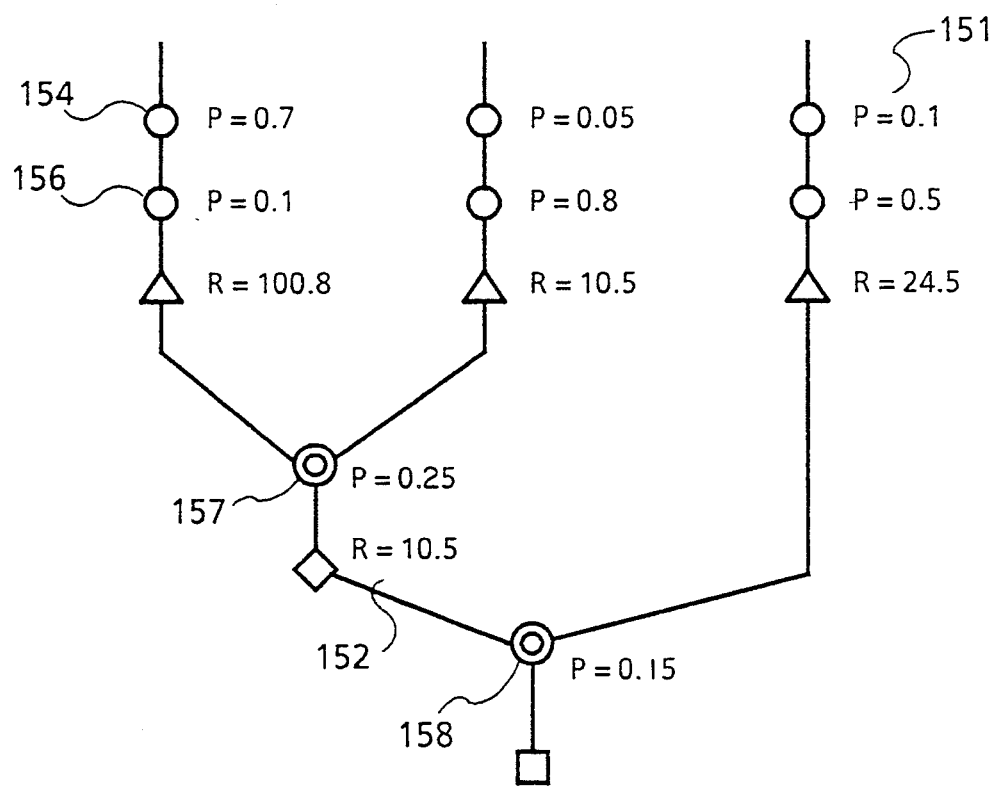
FIG. 15 is a diagram schematically showing a display example resultant from a condition judge processing achieved by use of the discrimination network in the embodiment according to the present invention.

FIG. 15 shows a display example of results attained from the condition judgements carried out depending on the discrimination network in the embodiment according to the present invention.

The log display section 7 presents, as shown in FIG. 15, the discrimination network on a screen together with the condition satisfaction probability for each of the intra-nodes and inter-nodes and an average reference count for the list stored in each memory node respectively attained from the data logging mechanism 5.

As can be seen from FIG. 15, a presentation item 151 i.e. P=0.1 denotes that the condition satisfaction probability is 0.1 in the pertinent memory node; whereas, an item 152, namely, R=10.5 designates that an average count of references made to a set of WMEs stored in the memory node is 10.5.

The structure derivation section 8 derives a processing sequence structure having a high processing efficiency based on the condition satisfaction probability for each of the intra-nodes and inter-nodes and an average reference count for the list stored in each memory node respectively attained from the data logging mechanism 5. The obtained processing sequence structure is presented on the screen i.e. the CRT 10.

Figure 16:
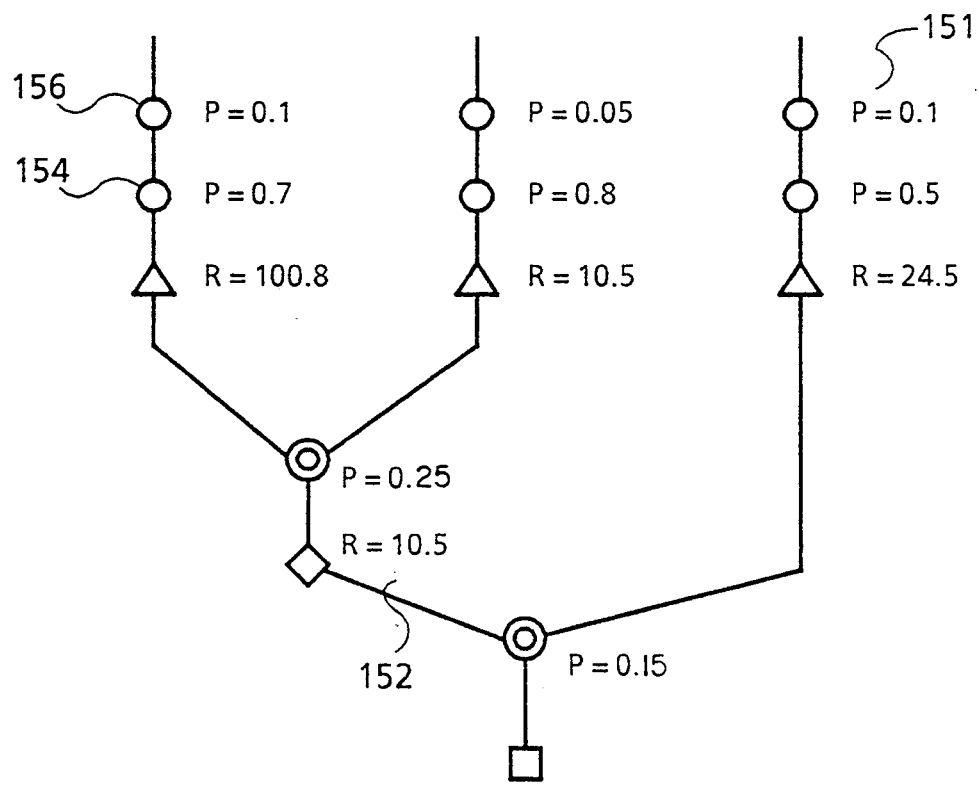
FIG. 16 is a diagram showing a new discrimination network exchanged by a structure decision or derivation unit.

In this situation, when deriving a processing sequence structure, the structure derivation unit 8 employs such standards as "a condition with a high probability of condition satisfaction in an intra-node is coupled with another condition at a position near a terminal node" and "a memory node ($\beta$-mem node) having a small value of the average reference count is to be deleted". The favorable processing sequence structure thus attained is displayed on the screen of the CRT 10 as shown in FIG. 16.

That is, for example, when the results of the condition judge processing are obtained as shown in FIG. 15, the probability of condition satisfaction is indicated as 0.7 and 0.1 for the intra-nodes 154 and 156, respectively. In consequence, in this situation, a higher processing efficiency can be developed when the intra-node 156 having the higher value of the probability is arranged at a position nearer to the terminal node as compared with the intra-node 154, namely, when the intra-node 154 is interchanged with the intra-node 156 as shown in FIG. 16. Consequently, the processing sequence structure of FIG. 16 is presented as a preferable processing sequence structure on the CRT 10.

In addition, assuming that the probability of condition satisfaction is displayed as 0.25 and 0.15 respectively for the inter-nodes 157 and 158 in FIG. 15, the discrimination network need only be modified e.g. as shown in FIG. 14 to improve the processing efficiency.

The dynamic structure exchange unit 6 compares the highly efficient processing sequence structure attained by the structure derivation unit 8 with a processing sequence structure of the discrimination network currently being used in the reasoning operation.

When the derived processing sequence structure is different from the processing sequence structure of the discrimination network currently being used, the situation is notified to the inference engine 2 so as to exchange the present processing sequence structure with the derived processing sequence structure in the inference engine 2.

Figure 17:
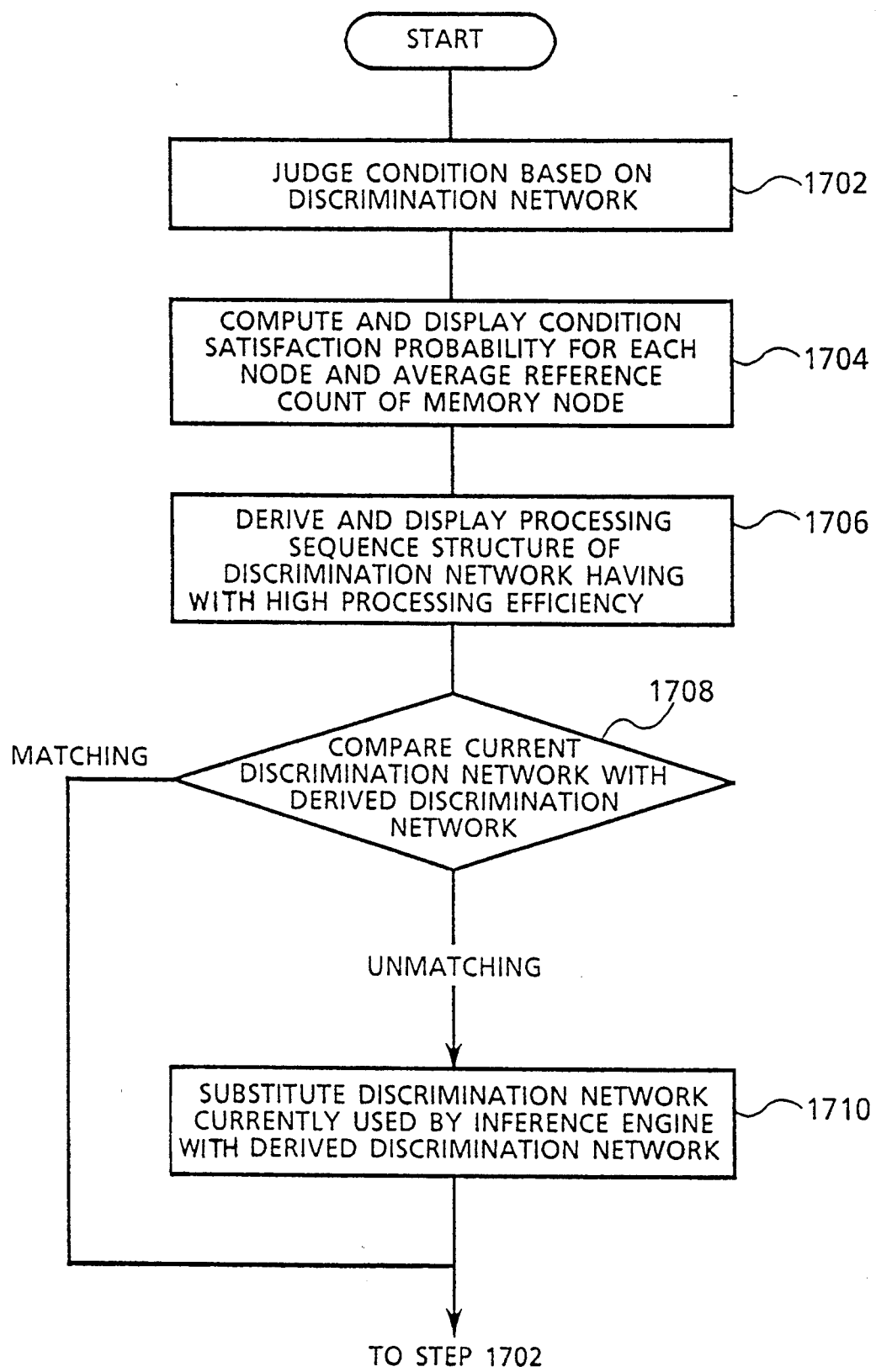
FIG. 17 is a flowchart showing the operation of the knowledge base system of FIG. 1.

FIG. 17 is a flowchart of the processing accomplished by the units 2 and 5 to 8 of FIG. 1. The processing flow is controlled, for example, by the data logging section 5.

First, a step 1702 is executed by the inference engine 2 to achieve the condition judge processing of FIG. 12 based on the discrimination network. In a step 1704, based on results obtained from the condition judgement, the data logging mechanism 5 computes a condition satisfaction probability for each node and an average reference count for a memory node ($\beta$-mem node) to supply results of the computation to the log display section 7, which then displays the discrimination network and the computation results on the CRT 10.

Next, a step 1706 is executed by the structure derivation unit 8 based on the computation results from the data logging unit 5 to produce and to display a discrimination network having a higher processing efficiency on the CRT 10.

In a step 1708, the dynamic structure exchange mechanism 6 compares the discrimination network currently being used by the inference engine 2 with the discrimination network thus created by the step 1706. If these networks match each other, the current discrimination network is continuously used; otherwise, the dynamic structure exchange unit 6 replaces the discrimination network currently being used by the inference engine 2 with the discrimination network derived by the structure derivation unit 8 (step 1710).

These processing sequences may be executed under control of the data logging section 5, for example, at a fixed interval of time. In consequence, based on the result of the condition judgement, the processing sequence structure may be altered at a preset interval.

In the example of FIGS. 10 and 11, only one rule is employed for the inference processing; however, as shown in FIG. 18, two rules may be sequentially processed. In such a case, a discrimination network is created as shown in FIG. 19.

Figure 19:
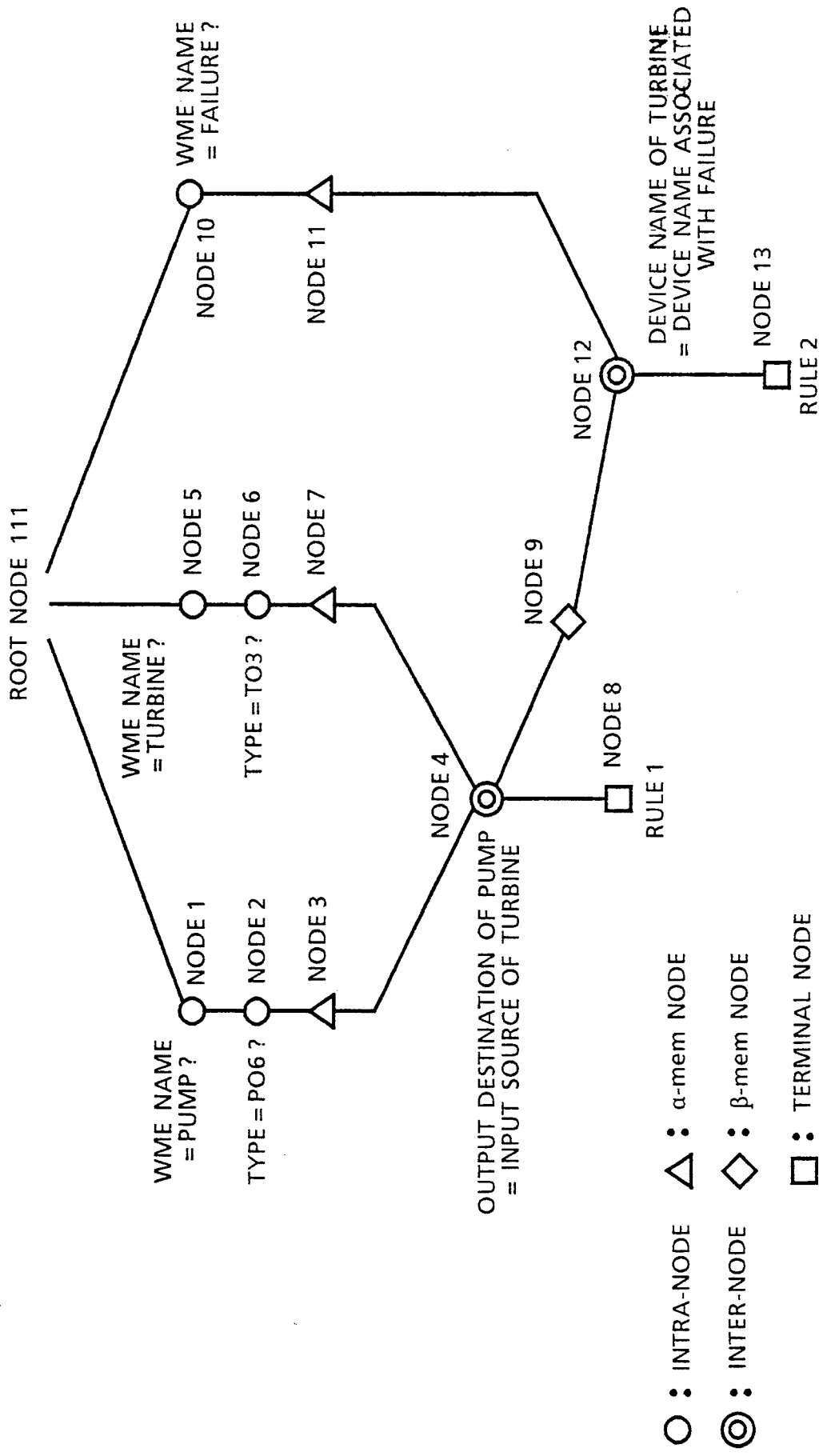
FIG. 19 is a diagram showing a discrimination network for the rules of FIG. 18.

According to the discrimination network of FIG. 19, a node 4 judges a condition "$output destination of pump=$input source of turbine" based on a WME2 being used and a WME stored in a memory node 3 linked with a branch on the left of the pertinent internode. Using WME1 already loaded in the memory node 3 in the previous cycle, the condition judgement is achieved depending on the WME1 and WME2, which results in satisfaction of the condition. Consequently, a list (WME1, WME2) is produced to be passed to a subsequent node 8.

In the node 8, the list (WME1, WME2) is added to the conflict set. In other words, it has been found that the list is an instantiation of the rule 1.

Moreover, the list is also sent to a node 9 to be stored in the β-mem node. Since a node 11 is not loaded with any WME information, an attempt of processing fails in a node 12, thereby terminating the processing of the WME2.

Furthermore, in a case where a WME3 (failure $device name turbine LX) is produced, processing of the WME3 in the nodes 1 and 5 results in disatisfaction of the condition; whereas, in a node 10, the condition is satisfied for the WME3 so as to memorize the WME3 in a node 11. Since a list (WME1, WME3) has been memorized in the memory node 2, the node 12 judges a condition "$device name of turbine =$device name related to failure" based on the list so as to resultantly create a list (WME1, WME2, WME3), which is added to the conflict set in a node 13.

Resultantly, at this point of time, the rule 2 becomes executable.

As above, also for a plurality of rules, by disposing a processing sequence structure description part in the rules, it is possible to generate a discrimination network developing a high processing efficiency.

According to the embodiment, the user can easily describe the processing sequence structure for condition satisfaction in the form of a list. Moreover, the probability of the condition satisfaction and the utilization degree of the memory node can be gathered as information for decision of the processing sequence structure. This consequently helps the user to easily determine a desired processing sequence structure.

In addition, when the user supplies typical problems to the system, the structure derivation unit 8 analyzes logging data resultant from processing of the problems so as to automatically display an efficient processing sequence structure. Namely, without analyzing the probability of condition satisfaction and effectiveness of the processing sequence structure, the user can attain a processing sequence structure leading to a high processing efficiency.

Moreover, the condition judge processing is monitored at a preset interval of time to dynamically replace the processing sequence structure adopted in a reasoning operation with an optimal processing sequence structure at a fixed interval. In consequence, also for a problem in which the probability of condition satisfaction and the utilization frequency of the memory node above are varied, the inference can be achieved with a high efficiency in any cases.

According to the present invention, the processing sequence structure essentially necessary to increase the reasoning speed can be simply specified by the user, thereby accomplishing the inference at a high speed.

Furthermore, with provision of a function in which a process of a condition judge processing is analyzed during an execution of a reasoning operation so that information necessary for determination of a processing sequence structure is displayed and/or an efficient processing sequence structure is proposed to the user, it is possible to help the user decide the processing sequence structure, thereby mitigating a decision load of the processing sequence structure imposed on the user.

In addition, since there is provided a function to optimize the processing sequence structure at a predetermined interval of time during an execution of a reasoning operation, an efficient reasoning operation can be continuously accomplished also for a problem having a property which alters during the inference processing.

As many apparently widely different embodiments of the present invention can be made without departing from the spirit and scope thereof, it is to be understood that the invention is not limited to the specific embodiments thereof except as defined in the appended claims.

We claim:

1. An inference method for use with a knowledge base system utilizing frames and a rule, each of said frames representing an associated object by a slot comprising an attribute name of the associated object and a value of the slot, said rule comprising a condition description part including a plurality of conditions each stipulating a state of an associated one of the frames and an operation description part stipulating an operation to be executed when the plurality of conditions stipulated by the condition description part are satisfied, the method comprising:

a step of specifying a sequence of condition judgements for satisfaction of the respective conditions associated with the respective frames of the condition description part of the rule;

a step of checking whether or not a frame which satisfies the sequence of condition judgements is stored in an inference memory means;

storing a frame which previously satisfied the sequence of condition judgements in the inference memory means;

judging, according to the specified sequence of the condition judgments whether or not the conditions of the condition description part respectively associated with the frames are satisfied, and executing the operation described in the operation description part when it is judged that all the conditions of the condition description part are satisfied;

analyzing a result of an execution of the judging achieved on a condition related to each frame associated with the rule; and deriving an optimal judging sequence for judging satisfaction of conditions respectively related to the frames of the condition description part of the rule based on the analyzed result.

2. The method according to claim 1 further including a step of disposing said specifying and checking steps in the rule wherein, said judging step executes the condition judgements depending on the specifying step disposed in the rule.

3. The method according to claim 1 wherein said rule is constituted with three constituent elements including the condition description part, the operation description part, and a processing sequence structure description part, said method further including:
a step of performing said specifying and said checking steps in accordance with said processing sequence structure description part,
wherein said judging step executes the condition judgements depending on the processing sequence structure description part.

4. The method according to claim 1 further including:
a frame passing step, operative when a condition judgement is achieved for satisfaction of a condition between frames, for passing the frames to a next condition judgement;

5. The method according to claim 4 wherein the judging step uses when executing the condition judgement for satisfaction between frames passed by said frame passing step, information stored in the inference memory means, the information being related to processing results associated with the frames.

6. The method according to claim 1 wherein said checking step includes storing for each said frame, information indicating whether or not a condition related to each said frame has been satisfied.

7. The method according to claim 6 wherein said step of judging includes a step of achieving a judgement between the frames in a case where each of a plurality of condition satisfaction judgements loaded in the memory and respectively associated with the frames indicates satisfaction.

8. The method according to claim 3 wherein:
said specifying step includes a step of establishing a correspondence between each condition associated with a frame constituting the condition description part of the rule and an identification name, thereby representing the judgement sequence in the form of a list structure with the identification name as an element thereof; and
said checking step includes a step of representing the specification in the form of the list structure.

9. The method according to claim 8 wherein said checking step includes a step of adding a symbol of a first kind to the identification name corresponding to the frame for a specification of non-storage of the associated frame and of adding a symbol of a second kind to the identification name corresponding to the frame for a specification of storage of the associated frame.

10. The method according to claim 1 further comprising a step of displaying on a display means information related to said step of judging associated with each frame associated with the rule.

11. The method according to claim 10 wherein said displaying step includes a step of displaying information resulting from an execution of said step of judging on the condition related to each frame associated with the rule.

12. The method according to claim 11 wherein said displaying step includes a step of attaining at least either a probability of satisfaction of a condition as a result of the judging achieved on the condition associated with each of said frames or a count denoting the number of operations in which a stored result of the judging conducted on a condition associated with a frame is employed as a judging result when judging a condition associated with another frame, thereby displaying the attained item as the information.

13. The method according to claim 12 wherein each of said frames include a plurality of slots and wherein said displaying step includes a step of displaying, for each said slot of each said frame, a probability of satisfaction as a result of the judging achieved on a condition associated with each of said frames.

14. The method according to claim 11 wherein said displaying step includes a step of displaying results of the judging of the conditions associated with the respective frames in the form of a tree structure.

15. The method according to claim 1 wherein each frame includes a plurality of slots and the slots are related to the conditions and wherein said deriving step includes a step of obtaining, for each slot of each said frame, a probability of satisfaction judged on a condition associated with the slot and of deciding a judging sequence for judging conditions associated with the slots of each frame in ascending order of the probability associated with the slots.

16. The method according to claim 1 wherein said analyzing and said deriving steps are conducted at a fixed interval of time.

17. The method according to claim 1 further comprising:
a step of comparing a judging sequence derived by said deriving step with a judging sequence specified by the specifying step; and
a step, operative when the comparing between the judging sequences results in a non-matching therebetween, of replacing the specified Judging sequence with the derived judging sequence.

18. The method according to claim 1, wherein said checking step includes a step of specifying in the rule whether or not frames which are judged to satisfy conditions existing between frames associated therewith, by the steps of judging, are stored in the inference memory means.

19. The inference method of claim 1 wherein the judging step occurs in a discrimination network and the method includes storing frames, or a pointer thereof, in a $\beta$-memory node of the network for intermediate conditions of the rule that have been judged to be satisfied, wherein the intermediate conditions comprise conditions of the rule between the frames associated with the conditions.

20. The inference method of claim 1 wherein the judging step occurs in a discrimination network and the method includes storing frames, or a pointer thereof, in an $\alpha$-memory node of the network comprising an $\alpha$-memory node for storing a frame which has been judged to satisfy the conditions of the rule.

21. An inference apparatus for use with a knowledge base system utilizing rules each rule being comprised of,
a condition description part including a condition stipulating states of frames, each frame representing an object by a slot comprising an attribute name of the object and a value of the slot, and,
an operation description part stipulating an operation to be executed when the condition is satisfied wherein a rule for which a condition of a condition description part thereof is satisfied is executed according to an operation described in the operation description part thereof, thereby conducting a reasoning operation, the apparatus comprising:

specifying means for specifying a sequence of condition judgements for satisfaction of a condition associated with each frame of the condition description part of a rule;

checking means for checking whether or not information related to a processing result obtained from a judging achieved on each said frame is stored in an inference memory means;

judging means for conducting the condition judgements for satisfaction of the condition associated with each said frame of the condition description part according to the specified sequence based on the information related processing results stored in the inference memory means as indicated by the checking means;

means for analyzing a result of an execution condition judgement achieved on a condition related to each frame associated with the rule; and means for deriving an optimal judging sequence for judging satisfaction of conditions respectively related to the frames of the condition description part, based on the analyzed results.

22. The apparatus according to claim 21 further including:

frame passing means, operative when a condition judgement is achieved for satisfaction of a condition between frames, for passing the frames to a next condition judgement.

23. The apparatus according to claim 22 wherein said judging means includes means for using, when executing a condition judgement for satisfaction between frames passed by said frame passing means, the information stored in the inference memory means, the information being related to processing results associated with the frames.

24. The apparatus according to claim 21 wherein said means for checking whether or not the processing result is stored in the inference memory means stores for each said framer as information related to the processing result, information indicating whether or not a condition related to the frame has been satisfied.

25. The apparatus according to claim 24 wherein said judging means includes means for achieving a judgement between the frames in a case where each of a plurality of condition satisfaction judgements loaded in a memory and respectively associated with the frames indicates satisfaction.

26. The apparatus according to claim 21 comprising means for displaying on a display means information related to the judging associated with each frame of the rule.

27. The apparatus according to claim 26 wherein said means for displaying the information on said display means includes means for displaying information results from an execution of a condition judgement on the condition related to each frame associated with the rule.

28. The apparatus according to claim 27 wherein said means for displaying the information on said display means includes:

means for attaining at least either a probability of satisfaction of a condition as a result of the condition judgement achieved on the condition associated with each said frame or a count denoting the number of operations in which a stored result of a judging conducted on a condition associated with each frame is employed as a judge processing result when judging a condition associated with another frame; and means for displaying the attained item as the information.

29. The apparatus according to claim 28 wherein each of said frames include a plurality of slots and wherein said means for displaying the information includes means for displaying, for each said slot of each said frame, a probability of satisfaction a result of the condition judgement achieved on a condition associated with each said frames.

30. The apparatus according to claim 27 wherein said means for displaying the information includes means for displaying the judging results of the conditions associated with respective frames in the form of a tree structure.

31. The apparatus according to claim 21 wherein each frame includes a plurality of slots and the slots are related to the conditions and wherein, said deriving means includes means for obtaining, for each slot of each said frame, a probability of satisfaction judged on a condition associated with the slot and for deciding a judging sequence for judging conditions of the slots of each frame in ascending order of the probability associated with the slots.

32. The apparatus according to claim 21 further including:

means for comparing a judging sequence derived by said deriving means with a judging sequence specified by the specifying means; and means, operative when the comparing between the judging sequences results in a non-matching therebetween, for replacing the specified judging sequence with the derived judging sequence.

33. The inference apparatus of claim 21 further including a discrimination network having a $\beta$-memory node for storing frames, or pointers thereof, which have been judged to satisfy conditions between the frames.

34. The inference apparatus of claim 21 further including a discrimination network having an $\alpha$-mem node for storing a frame, or a pointer thereof, which has been judged to satisfy the condition of the rule.

* * * * *

UNITED STATES PATENT AND TRADEMARK OFFICE
CERTIFICATE OF CORRECTION

PATENT NO. : 5,353,385
DATED : October 4, 1994
INVENTOR(S) : Shunichi Tano, et al.

It is certified that error appears in the above-indentified patent and that said Letters Patent is hereby corrected as shown below:

Claim 5, column 17, line 21, after "uses" insert --,--.

Claim 21, column 19, line 13, after "related" insert --to--;
line 16, after "execution" insert --of a--; and,
line 22, after "part" insert --of the rule--.

Claim 24, column 19, line 39, delete "framer" and substitute therefor --frame,--.

Claim 27, column 19, line 54, after "information" insert --related to--.

Claim 29, column 20, line 21, after "satisfaction" insert --as--.

Signed and Sealed this

Fifteenth Day of November, 1994

Attest:

BRUCE LEHMAN

*Attesting Officer*   *Commissioner of Patents and Trademarks*